United States Patent [19]
Coutta

[11] 3,935,380
[45] Jan. 27, 1976

[54] SURVEILLANCE SYSTEM

[76] Inventor: John M. Coutta, 450 Superior Ave., Decatur, Ga. 30030

[22] Filed: Dec. 6, 1974

[21] Appl. No.: 530,133

[52] U.S. Cl. ...... 178/6.8; 178/DIG. 1; 178/DIG. 38
[51] Int. Cl.² .......................................... H04N 7/18
[58] Field of Search ....... 178/6.8, DIG. 38, DIG. 35, 178/DIG. 1

[56] References Cited
UNITED STATES PATENTS

| | | | |
|---|---|---|---|
| 2,538,910 | 1/1951 | Miller | 178/6 |
| 3,226,476 | 12/1965 | Tyler | 178/6 |
| 3,612,764 | 10/1971 | Gilkerson | 178/7.88 |
| 3,819,856 | 6/1974 | Pearl | 178/7.81 |

*Primary Examiner*—Robert L. Griffin
*Assistant Examiner*—Edward L. Coles

[57] ABSTRACT

A closed circuit TV surveillance system for retail and industrial establishments in which one or more cameras are movable along a rail assembly suspended from the ceiling which enables the cameras to be selectively trained on any area of interest within the establishment. Employing two cameras, one may be both tilted and horizontally trained to observe any location within the line of sight of the camera and the other one particularly tilted and trained to observe the amount showing on a cash register.

6 Claims, 4 Drawing Figures

FIG. 1

SURVEILLANCE SYSTEM

BACKGROUND OF THE INVENTION

1. Field of the Invention

This invention relates to surveillance systems, and particularly to a TV-type surveillance system adapted to be employed in a retail sales establishment having a number of checkout stations and in industrial businesses having multiple shipping and receiving docks.

2. General Description of the Prior Art

The business need of surveillance of retail and industrial sales establishments to prevent losses is well established. Thievery in such establishments is estimated to total at least three billion dollars per year in the United States alone. This in turn results in greater costs of merchandise to everyone. In recognition of this problem, television cameras have been mounted at strategic locations within an establishment and have proved beneficial at reducing thievery. The difficulty with existing such systems is that they lack the versatility to fully effectively monitor store operations. At this point, it is well to note the expanded need for surveillance which goes beyond shoplifting and includes monitoring of employees entering and leaving; employee performance and efficiency; thefts through rear doors of an establishment by employees, delivery people and others; and perhaps most urgently needed is surveillance of checkout operations to ascertain that proper amounts are registered for merchandise. For example, it is estimated that in a 12-register "front end" where each register has a weekly volume of $8,000 and a gross volume of $384,000 per year, that there will occur a startling "shrink loss," as it is called, by virtue of failure to fully charge for merchandise, of $5,760. This is based upon a national average of 1½ percent loss.

Accordingly, it is an object of the present invention to provide a new and improved closed circuit television surveillance system which provides for operation which goes far beyond that previously available from such systems, largely shoplifting, and to enable coverage of other vital areas of concern.

SUMMARY OF THE INVENTION

In accordance with the invention, a TV camera assembly is mounted on a transporter and the transporter is in turn supported by a linear rail assembly extending over a selected distance. The assembly is mounted on the ceiling of an establishment, typically being positioned on the "in" side of checkout stations and positioned so that cameras may be selectively positioned to observe each checkout station without being observed. A semi-circular, semi-opaque cover extends along the bottom of the assembly, enabling the cameras to be masked from view. As one feature of the invention, one camera would be horizontally trainable and vertically tiltable for extensive observation throughout the establishment, and a second camera would be tilted at a fixed angle and have a focal length adjustment of its lens adapted to observe amounts registered on a cash register at the same time the other camera is adapted to take in a wider field of view to include the clerk operating a cash register. In this fashion, the correctness of transactions may be readily monitored and at the same time the effectiveness and demeanor of the clerk may be viewed. Recording means adapted to record discrete frames at selectively spaced periods enable effective monitoring of relatively long periods of time with relatively short actual recording periods, and thus enable the operation to be most efficiently and effectively accomplished. For example, it has been found that by operating the recorder to record a frame per second sufficient data may be recorded. In this manner up to 48 continuous hours of business operations may be recorded on a conventional TV recorder and then reviewed in only one hour.

DETAILED DESCRIPTION OF THE DRAWINGS

Figure 1:
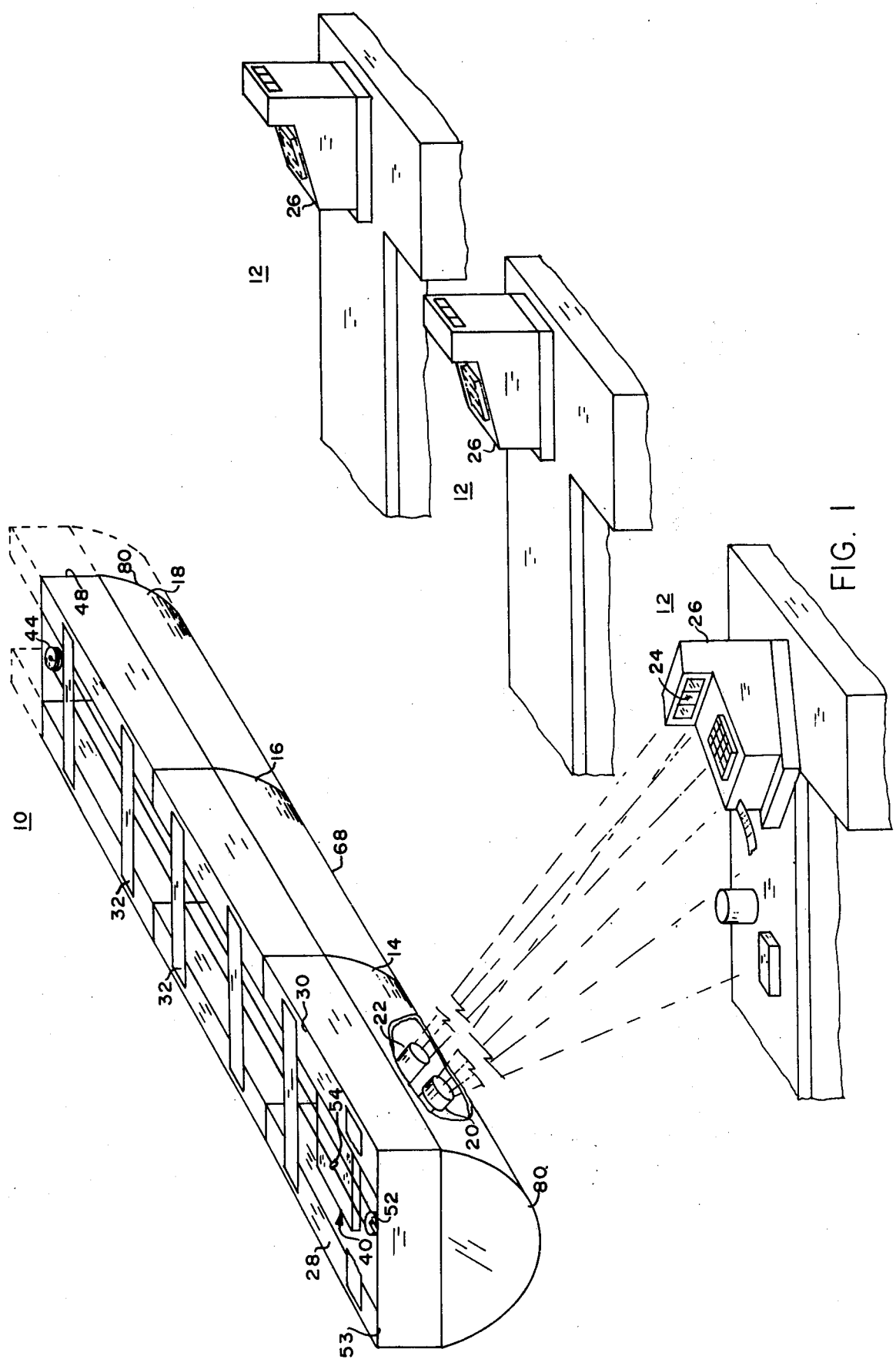
FIG. 1 is a schematic illustration of a principal portion of an embodiment of the invention.
Figure 2:
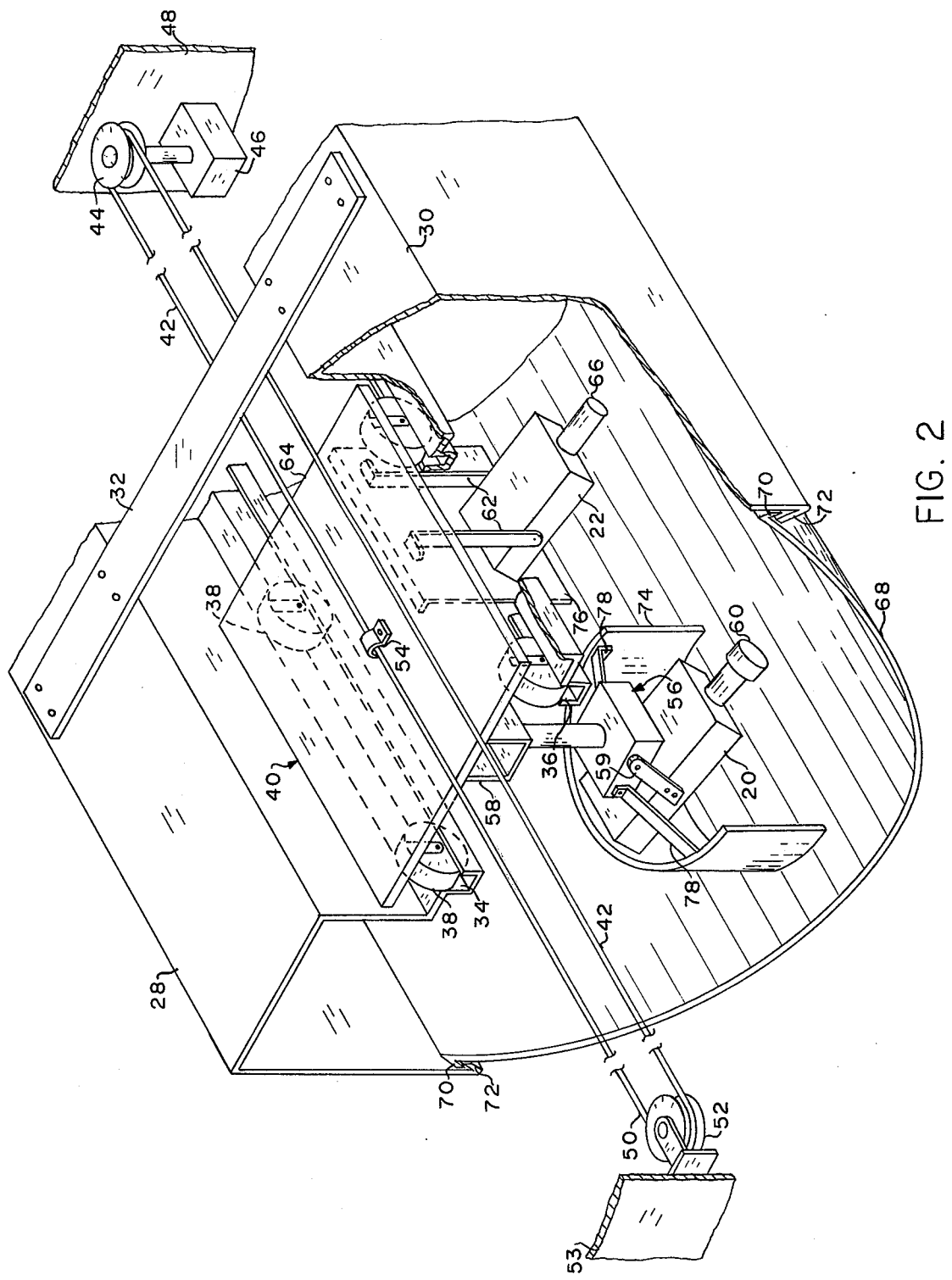
FIG. 2 is a perspective view of the arrangement of the principal components of the invention.

FIG. 1 particularly illustrates the placement of surveillance unit 10 with respect to checkout stations 12 of a business establishment, and FIG. 2 illustrates the arrangement of components of the assembly, being actually a sectional portion of the overall assembly illustrated in FIG. 1. In practice, the system is made in sections, as illustrated by sections 14, 16, and 18 in FIG. 1 to enable ready construction of surveillance assemblies of any given length. As shown in FIG. 1, camera 20 is adapted to view a complete checkout area 12 and camera 22 adapted to view a readout 24 of a cash register 26. Surveillance assembly 10 includes a pair of oppositely positioned channel members 28 and 30 which are connected by supporting strips 32 and these members are adapted to be attached to a ceiling of an establishment (not shown). A pair of guide rails 34 and 36 (FIG. 2) are connected to the inboard sides of channels 28 and 30, extending the length of the surveillance assembly. These guide rails provide a track for casters 38 which support carriage 40 and thus enable it to be transported along the length of the surveillance assembly. Carriage 40 is driven by an endless cable 42 which is in turn connected through pulley 44 to reversible drive motor 46 supported by end plate 48. Cable 42 is supported at the opposite end 50 by idler pulley 52 in turn supported by end plate 53. Cable 42 is attached to carriage 40 by bracket 54 which thus enables movement of carriage 40 upon operation of motor 46.

Figure 3:
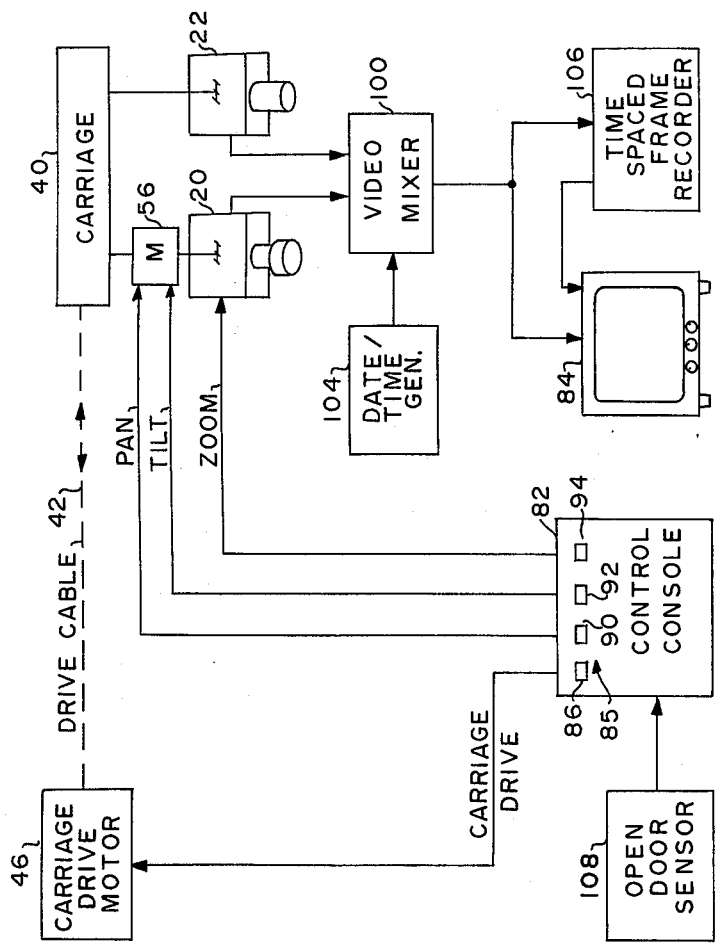
FIG. 3 is a schematic diagram of the overall system of the invention.

Camera 20 is mounted on motor assembly 56 in turn supported by U-shaped bracket 58 on carriage 40. It is rotatable by means of a reversible rotor of motor assembly 56 causing rotation about its vertical axis, and camera 20 is tiltable by means of a reversible tilt motor included in motor assembly 56 which produces rotation of arms 59 to which camera 20 is attached. Camera 20 is equipped with a zoom-type lens 60 which is remotely controlled from the console as shown in FIG. 3. A second TV camera 22 is supported by vertically disposed brackets 62 beneath platform 64 of carriage 40 and to the sides of camera 22. Typically, the focal length of lens 66 of camera 22 is manually adjusted for a desired field of view, a cash register readout as illustrated in FIG. 1.

The bottom region of surveillance assembly 10 is covered by a semi-circular, semi-opaque cover 68 which is connected by means of turned-out flanges 70 mating with turned-in flanges 72 attached to the ends of channels 28 and 30. This cover enables essentially one-way viewing, that is, the cameras can look outward through the cover but it is difficult for one to view the cameras from outside, and thus personnel cannot readily determine whether or not the cameras are positioned to view them, such as being positioned as shown in FIG. 1 opposite a checkout station 12 or positioned elsewhere as, for example, to view one of the other checkout stations. As a further aid is masking the viewing of the cameras, camera 20 includes a semi-circular shield 74 covering the back and sides of the camera, and camera 22 is covered by a shield 76, the latter being mounted on carriage 40 and the former being supported to motor assembly 56 by brackets 78. End covers 80 (FIG. 1) have a similar opacity to that of cover 68 and are secured over end plates 48 and 53.

Figure 4:
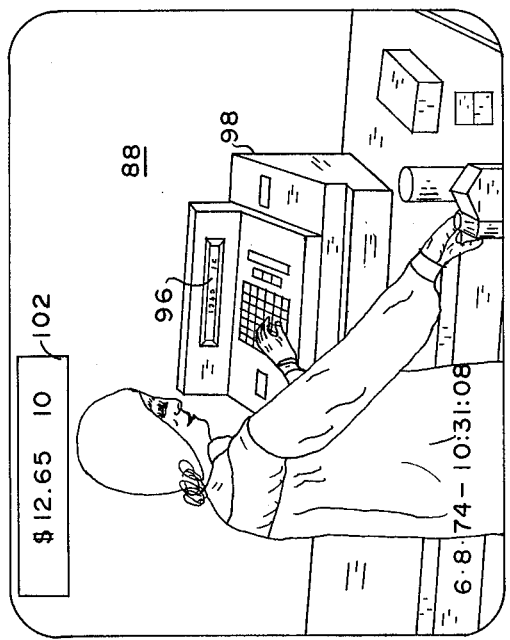
FIG. 4 is a partially perspective and diagrammatic view of a monitored display as contemplated by the invention.

The overall system of the invention is shown in FIG. 3. The system is controlled by a control console 82 which would be operated by an operator who would view TV monitor 84 and determine desired surveillance. Control console 82 contains conventional circuitry to apply by means of controls 85 the indicated output control signals to the devices they control. Thus, control 86 enables the operator to control the operation of carriage drive motor 46 to position carriage 40 and cameras 20 and 22 at a desired location as, for example, to view a particular checkout 88, as illustrated in FIG. 4. Pan control 90 reversibly controls motor assembly 56 to cause camera 20 to be trained to the left, to the right, or to the rear. Tilt control 92 operates motor assembly 56 to reversibly vary the tilt of camera 20. Zoom control 94 controls the focal length control of camera 20 to vary the magnitude of the area or field to be viewed. Camera 22 is typically set at a fixed angle and left with a fixed focal length adjusted to enable it to view digital readout 96 of a cash register 98 (FIG. 4). The outputs of cameras 20 and 22 are conventionally combined in a video mixer 100 to provide as an output a composite of the camera outputs as illustrated in FIG. 4 wherein the large presentation 88 is representative of the output of camera 20, and the small presentation 102 is representative of the output of camera 22. Date-time generator 104 contains a date-time clock and provides in a conventional fashion a further input to video mixer 100, resulting in a presentation on monitor 84, and in the lower left hand corner of FIG. 4, date-time digits. Video recorder 106 is fed the same information as monitor 84 and may be operated continuously to accumulate information or to be selectively turned on to record selected presentations. In order to provide effective monitoring over relatively long periods of time which may be presented on monitor 84 in a shorter time, means are provided to operate recorder 106 intermittently to thus, for example, record single frames at some selected relatively slow rate, say one frame per second. This, for example, thus enables playback of these same frames in a much shorter time, enabling, for example, the monitoring of 48 hours of actual surveillance in approximately one hour.

Open door sensor 108 is responsive to a door, typically a back door, being opened and provides a signal to control console 82 which automatically causes the pan and tilt signal to operate motor assembly 56, to train camera 20 on that door and to operate the zoom mechanism of camera 20 to adjust the focal length of camera 20 to a desired magnitude of field of view. This aspect of the system enables the observation, for example, of a rear door to keep track of merchandise being brought into or leaving an establishment.

From the foregoing, it will be appreciated that the present invention provides a new concept and system of surveillance of business establishments. Camera 20 may be moved, trained horizontally, tilted and zoomed to examine an extremely wide area of an establishment. At the same time it, together with camera 22, enables detailed surveillance of checkout operations to thus very substantially reduce losses which presently occur by incorrect, often fraudulently, charges. The system further provides for effective monitoring of employee activity in general which enables effective analysis of such things as personnel efficiency, stock replenishment, merchandise flow from storage to counter, and in general the effectiveness of personnel in their jobs. These features thus clearly distinguish the present system over previous ones wherein the primary task was to detect and hopefully frustrate shoplifting and employee pilferage in limited areas.

What is claimed is:

1. A surveillance system for viewing a plurality of spaced, in-line stations comprising:
   an elongated carriage track positioned along a line parallel to the line of said stations;
   a carriage adapted to be supported by and be movably operated on said track;
   drive means for selectively positioning said carriage along said track;
   a television camera supported by said carriage;
   first training means for rotating said camera horizontally and second training means for tilting said camera;
   display means for displaying the output of said camera;
   control means for selectively operating said drive means and for operating said first and second training means whereby said camera may be positioned to selectively view said stations; and
   a semi-circular partially opaque, but otherwise transparent, cover extending from end to end of said system and covering said camera and carriage as they are moved end to end.

2. A surveillance system as set forth in claim 1 further comprising a second television camera having an output coupled to said display means and supported by said carriage and being fixed positioned to scan a selected region along a direction generally normal to the direction of movement of said carriage, whereby said first-named television camera may scan a selected area generally and said second television camera may be employed to scan a particular portion of that area.

3. A surveillance system as set forth in claim 2 wherein said stations comprise cash registers including digital readouts and said second camera is positioned and adapted to selectively view a said digital readout.

4. A surveillance system as set forth in claim 3 further comprising a semi-circular shield surrounding a rear and side portion of said first-named television camera, and said system including means for moving said shield as a said camera is moved, whereby the back and sides of said camera are further masked from view.

5. A surveillance system as set forth in claim 3 wherein said control means further comprises:
   means for controlling said first-named camera focal length; and video recording means including means for spaced-in-time frame recording of the output of said cameras.

6. A surveillance system as set forth in claim 5 further comprising a date-time generator coupled to the input of said video recording means.

* * * * *